Figure 1:
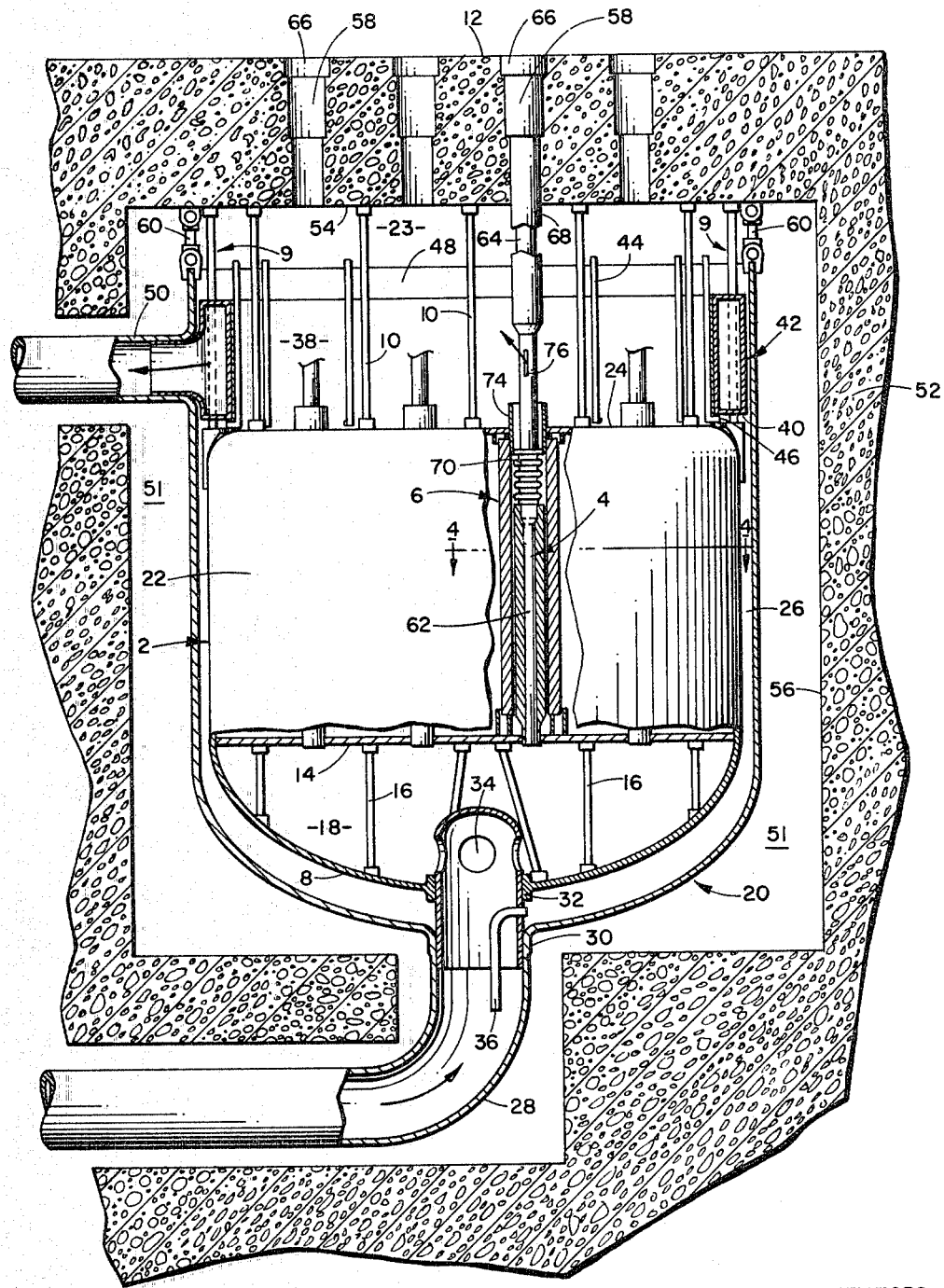

Jan. 3, 1967  W. S. PECK ET AL  3,296,085
CALANDRIA CORE FOR SODIUM GRAPHITE REACTOR
Filed July 24, 1964  3 Sheets-Sheet 1

INVENTORS
WILLIAM S. PECK
RICHARD S. DUNCAN
BY ARDELL C. WILLIAMS

Gerald G. Koris
ATTORNEY

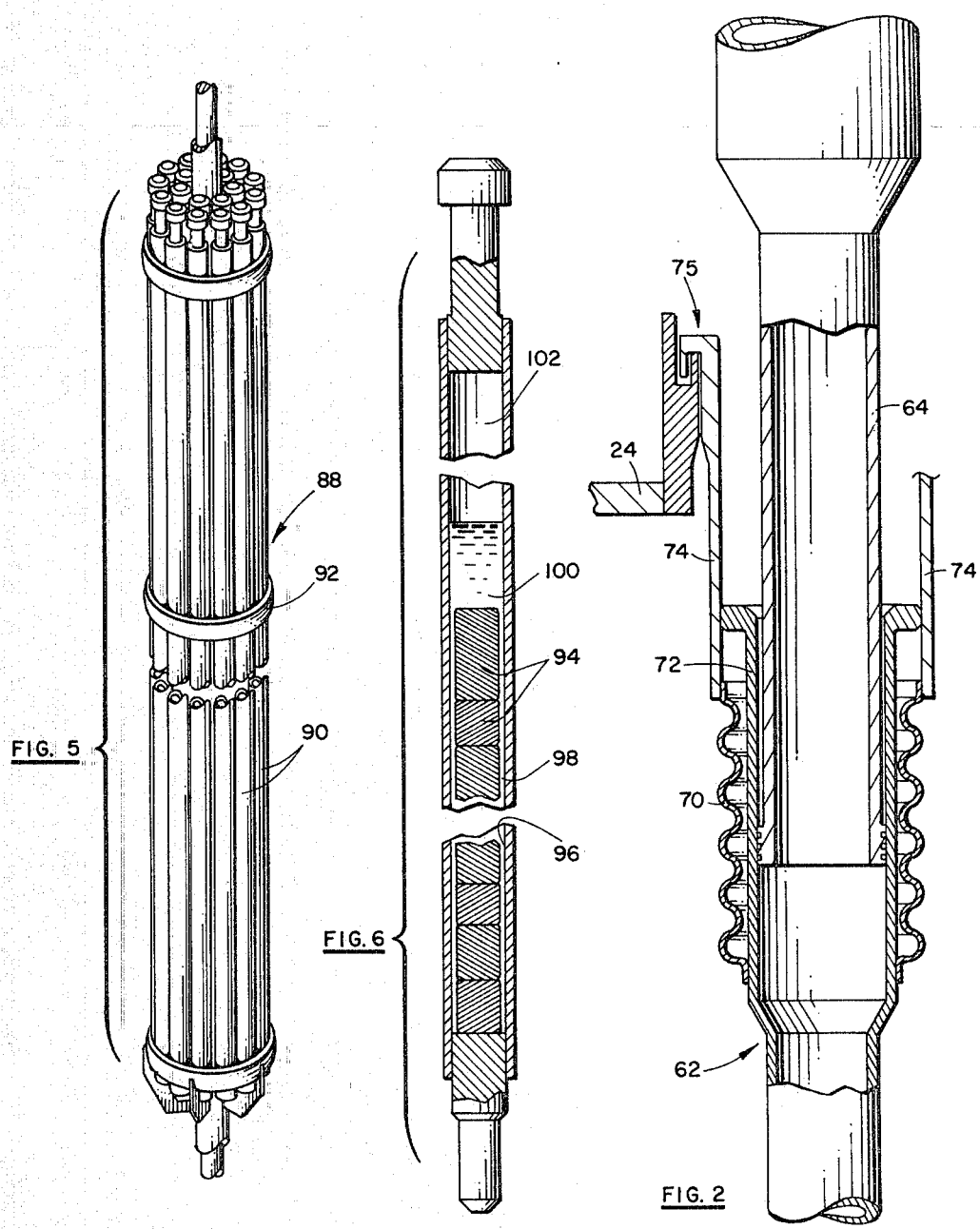

INVENTORS
WILLIAM S. PECK
RICHARD S. DUNCAN
ARDELL C. WILLIAMS
BY
Gerald A. Karis
ATTORNEY

United States Patent Office 3,296,085
Patented Jan. 3, 1967

3,296,085
CALANDRIA CORE FOR SODIUM GRAPHITE REACTOR
William S. Peck, Pacoima, Richard S. Duncan, Canoga Park, and Ardell C. Williams, Chatsworth, Calif., assignors, by mesne assignments, to the United States of America as represented by the United States Atomic Energy Commission
Filed July 24, 1964, Ser. No. 385,003
13 Claims. (Cl. 176—61)

The present invention relates to a graphite-moderated, sodium-cooled nuclear power reactor, and more particularly to an improved calandria core for such reactor.

The development of the sodium graphite type of power reactor has seen the development in its core structure from a canned moderator design to a calandria-type structure. In the earlier canned moderator design, as disclosed in U.S. Patent 2,929,768 (Mahlmeister et al.), the core is composed of a plurality of hexagonal blocks of graphite, each such block or "can" being encased in an outer protective metal sheath. The purpose of separately encasing each graphite block is to limit possible damage to the reactor core in the event of failure of any individual moderator block; if the cladding of any given moderator block fails, sodium will flood only that block and not the entire reactor core. However, an economic price is paid for the canned moderator through increased fabrication costs and poorer neutron economy because of neutron capture by the cladding metal.

To overcome the economic disadvantages of the canned moderator, calandria-type cores have been developed, as shown in U.S. Patents 3,080,308 (R. W. Dickinson) and 3,121,052 (Peterson et al.). The calandria is a large, cylindrical tank which contains the graphite moderator and reflector. The graphite is not separately canned; process tubes penetrate the core axially, and are joined to the top and bottom heads of the calandria. The fuel elements are positioned in the process tubes, and heat is removed from the fuel by the sodium coolant which flows from a lower plenum below the core to an upper plenum above the core. The calandria core designs generally permit operation at high sodium temperatures and high specific powers, resulting in improved neutron economy over canned moderator designs.

However, substitution of a calandria for the canned moderator creates certain hazards in that, if a process tube were to suffer a major failure or a failure which went undetected over a long period of time, serious damage to the reactor core could result from sodium flooding. For this reason, attention is devoted in the design of a calandria core to avoid such an incident, and also to temperature distributions throughout the reactor core, differential thermal expansion, stresses, hydraulic pressures, and the like.

Previous calandria designs utilized beam-type support of the calandria vessel, with the beam positioned under the vessel. Such beams, with combined tensile and compressive loads, are subject to creep buckling at design temperatures. Further, there was direct connection between the calandria vessel and the enclosing reactor vessel, such that the different temperatures of the vessels during reactor operation would cause differential thermal expansion. Radial temperature gradients within the reactor core might also result in differential thermal expansion of process tubes, thereby increasing stresses and failure possibilities.

An object of the present invention, therefore, is to provide an improved calandria core for a sodium graphite reactor.

Another object is to provide such a reactor which diminishes stress-producing differential thermal extensions.

Another object is to provide such a calandria core for a sodium graphite reactor which is not thermally coupled to an enclosing reactor vessel.

Another object is to provide a removable unit cell for such a calandria core and the support structure therefor.

Still another object is to provide a calandria vessel wherein the structural materials have the same rate of thermal expansion and there are no appreciable radial thermal gradients.

Still another object is to dispose the main supporting structure for the calandria core in a region having a relatively lower temperature than the core.

A further object is to provide a calandria core wherein core components such as fuel and moderator remain at a more constant relationship through all temperature ranges.

Still another object is to reduce stress discontinuities and thermal transient effects in the reactor vessel by having such vessel no longer contain the pumping pressure, thereby permitting more economical and reliable design.

A still further object is to provide in such a reactor core improved coolant inlet and outlet distribution means.

Other objects and advantages of the present invention will become apparent from the following detailed description taken together with the appended drawings.

Figure 4:
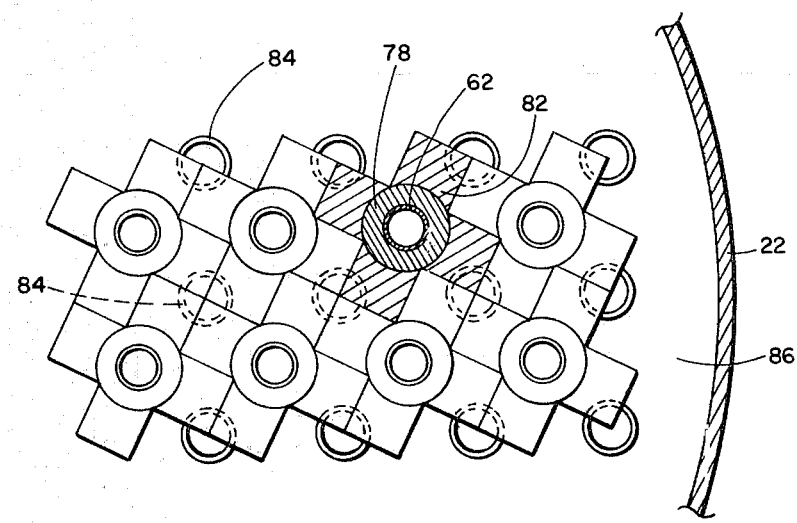
Figure 3:
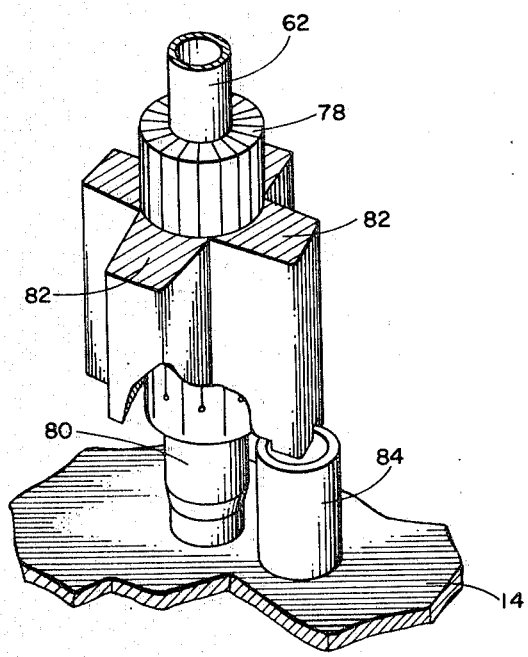

In the drawings:
FIG. 1 is an overall elevation view, partly in section, of the present reactor structure;
FIG. 2 is an enlarged section of the upper portion of a process tube;
FIG. 3 is a perspective view of the bottom portion of a process tube and associated graphite members;
FIG. 4 is a partial horizontal section through the calandria core, showing the overall core configuration;
FIG. 5 is a perspective view of a fuel element; and
FIG. 6 is an enlarged vertical section of one fuel tube of the fuel element.

Turning to FIG. 1, the reactor features the calandria vessel 2 which provides support and containment for the graphite moderator and reflector. Its principal advantages are low capital costs, neutron economy, and tolerance for graphite shrinkage. The calandria and the process channels 4 provide the means for separating sodium and graphite 6 while utilizing a minimum of structural steel within the active portion of the core, thereby improving neutron economy. The present calandria vessel is constructed of Type 304 stainless steel and is featured by an integral elliptical lower head 8. It is supported from hanger rods 9 located around the upper portion of the cylindrical calandria shell 22 and fastened to the underside of the loading face shield 12. The loading face shield 12 thus serves as a beam for the support of calandria core tank 2 which hangs therefrom, and also for the support of reactor vessel 20 as described below. The top plate 24 is supported from hanger rods 10 and fastened to the underside of the loading face shield 12. A bottom grid plate 14 is located at the intersection of the cylindrical vessel wall and elliptical lower head 8, and is supported and fastened to the lower head by vertical rods 16.

The lower head 8 and bottom plate 14 of the calandria provide a pressure plenum 18 for the inlet sodium coolant. Since the dynamic pressure is contained in this plenum, the enclosing reactor vessel 20 and calandria outer shell 22 are relieved of all pressure except the static sodium pressure in plenum 38 and the helium cover gas pressure thereabove in space 23, which is essentially atmospheric. Normal external operating pressures are 5 p.s.i.g. on calandria top plate 24 and 33 p.s.i.g. on bottom grid plate 14 and elliptical head 8 which bound plenum 18. Operating temperatures are 1150° F. on top plate 24 and 750° F. on members 8 and 14. The reactor vessel 20 and calandria vessel 2 are thus completely separated and have no connections which would limit the independent vertical expansion of either vessel. Since the reactor vessel no longer contains a pumping pressure, it can be designed with greater economy and reliability. Stress discontinuities and thermal transient effects are appreciably reduced.

A description of the general reactor layout follows. The reactor is housed in a cavity 51 defined by a steel-lined concrete structure 52 in the operating floor of the reactor building. The cavity 51 is capped with loading face shield 12 consisting of dense concrete and reinforcing steel, which forms a continuation of the operating floor over the reactor and provides radiation protection for operating personnel. Beginning at the outer perimeter of the concrete cap and moving radially inward, the reactor structure consists of a cavity liner and thermal shield 56, reactor vessel 20, and calandria vessel 2. The reactor vessel 20 provides a container for the calandria core and the sodium coolant. It is made of austenitic stainless steel and is supported from loading face shield 12 by a plurality of hangers or turnbuckles 60 fastened to its upper edge. The reactor vessel 20 is provided with a conventional external liner (not shown) for secondary sodium containment and would contain the sodium level above the core in the event of a leak in reactor vessel 20.

The loading face shield 12 does not have the rotational requirements of other sodium graphite reactors. For this reason, it is fixed and becomes simply the upper closure for the reactor cavity and the reactor vessel. Nitrogen cooling coils (not shown) are embedded in lead on the top surface of the bottom plate 54 so that the concrete temperature can be maintained below 150° F. Reflective insulation is incorporated below top shield 12 and around concrete cavity 52 to reduce the heat flow from the reactor.

Sodium coolant is provided for the annular region 26 between the calandria and the reactor vessel in the following manner. The inlet coolant line 28 is welded to the reactor vessel at point 30 but extends in a slip-fit through a labyrinth fitting 32 in the axial center of bottom head 8 where the sodium is diffused for distribution through port 34. The sodium leakage from plenum 18 through fitting 32 plus a regulated flow from coolant line 36 provide the necessary coolant for annular region 26. The coolant in the annular region is separated from that in the upper plenum 38 by the bottom plate 40 of an annular outlet manifold 42 which uniformly collects the outlet sodium flow. Extension standpipes 44 connected to manifold 42 and having ports 46 in the bottom portion thereof allow the annulus coolant to flow through and above to the free surface 48 of the upper plenum coolant where it overflows into upper plenum 38. These standpipes 44, in combination with the distribution manifold 42, keep convection currents and uneven drawdown of the free surface from affecting the temperature distribution on the reactor walls. Under normal operating conditions the reactor vessel contains sodium to a level about 15 feet above the calandria top plate. There are two large coolant lines opening into the vessel, inlet line 28 and a main sodium outlet line 50, which enters through the side of the vessel several feet above calandria top plate 24.

The process tube 62 is shown generally in FIG. 1 and enlarged top and bottom sections thereof in FIGS. 2 and 3, respectively. The process channels house the fuel elements and control elements and provide a flow channel for the sodium coolant through the core. The process channel is divided into three functional parts: (1) the process tube 62 through the core, (2) the orifice tube 64 which extends down from a support step in fuel ports 58 to an engagement within the upper portion of process tube 62, and (3) the fuel shield plug 66 and orifice casting 68 which extend down the loading face shield into orifice tube 64 and provide coolant flow control. The process tube is of Type 304 stainless steel with a 0.025-inch wall and has brazed joints at both ends to allow remote removal and reinstallation. The design of the calandria vessel and the unit cell provides for removal and replacement of any individual process tube or group of process tubes and associated graphite. Each process tube 62 has a bellows 70 (FIG. 2) near calandria top plate 24 (or alternatively near grid plate 14) to accommodate differential expansion between tubes and calandria shell, and between adjacent tubes operating at slightly different temperatures. The top of the process tube has a guide sleeve 72 which protects the bellows from stress caused by sodium flow or external lateral loads, and which rides in process tube top joint 74. Top joint 74 is joined to top plate 24 at brazed joint 75.

Flow through the fuel process channels is controlled by orifice tubes 64 (FIG. 1) which extend up from inside the process tubes and are suspended from loading face shield 12. This tube rests on the step of the opening through the loading face shield and makes a sliding fit into the process tube below, as seen in FIG. 2. Orifice tube 64 contains two opposing slots which match up with triangular openings in the orifice casting extension 68 of the fuel shield plug assembly to produce an adjustable flow area through which the sodium coolant discharges from the process channel 62 into reactor upper plenum 38 through ports 76. Coolant flow adjustments are made, as required by changes in core power distribution, at the operating floor by a rotating device which provides a vernier-type control over the range of rotation of the plugs. The fuel shield plugs 66 are equipped with quad-ring seals to provide a gas-tight seal to the top shield.

The unit cell moderator configuration and bottom portion of the process tube is shown in FIG. 3. The process tube 62 penetrates a graphite center log 78, cylindrical in shape and with a hole through its center, and is joined to grid plate 14 by fitting 80. The process tube center log 78 is assembled as part of the process tube. The unit cell is completed with four filler logs 82 in a cruciform configuration. The filler logs are supported on cylindrical metal columns 84 to bottom grid plate 14 of the calandria. This unit cell is repeated throughout the core in a rectangular lattice (FIG. 4). The five graphite logs making up a unit cell can be removed and replaced through the loading face shield hole associated with the cell with an appropriate grappling tool. The space 86 between the graphite logs and the calandria is filled with helium. The helium is used to provide a medium in which sodium vapor can be detected to indicate possible sodium leaks into the calandria vessel. The helium is circulated to an externally located unshielded sodium vapor detector.

The fuel element 88 designed to fit in the process tube of the present reactor is shown in FIGS. 5 and 6. It consists of a bundle of 18 fuel rods 90 and a dummy center tube supported by spacer bands 92. The fuel rods are made up of a plurality of uranium monocarbide slugs 94 assembled in stainless steel tubes 96. The fuel slugs are bonded to the tubes by sodium in annulus 98 and above the top slug 94 in space 100 to improve heat transfer and to allow for local diametral swelling. A gas space is provided above the fuel within each tube for expansion and fission gas collection. Although the elements are heavy enough to offset the hydraulic uplift of the coolant, for additional safety they are latched into a seat at the bottom of the process channel with conventional fittings.

A general description of the sodium heat transfer system which is within the present knowledge of the art follows. This system removes the heat generated in the reactor core and delivers it to steam generators for steam production. Heat transfer is accomplished by circulating a liquid sodium heat transfer medium in parallel sodium circuits, the number of circuits depending upon reactor power rating. Each of these circuits consists of a radioactive primary loop which transfers thermal energy from the reactor to the intermediate heat exchangers, and a nonradioactive secondary loop which carries heat from the intermediate heat exchangers to the steam generators. The intermediate heat exchangers are utilized to separate the radioactive sodium of the primary loop from the steam generators. This is done to permit access to the steam generating facilities during operation and to protect the reactor from pressure and temperature surges which could result from a steam or water leak in the steam generator.

Each of the parallel sodium circuits incorporates separate steam generators, which consist of sodium-heated low-temperature modules, sodium-heated high-temperature modules, and sodium-heated reheaters. The intermediate heat exchangers and steam generators are arranged vertically and elevated with respect to the core so that a natural convection head will exist in each circuit to remove decay heat in case of power loss or other malfunction. Sodium purification is performed with cold traps and hot traps. Separate purification systems are provided for radioactive and nonradioactive sodium system.

The following table presents the design conditions of the reactor plant discussed above in greater detail, and serves as a specific example of the present invention.

DESIGN AND PERFORMANCE CHARACTERISTICS FOR A 200 Mw.(E.) PLANT

Plant:
- Net plant electrical output ____ 198,700 kw.
- Net plant heat rate _____ 8,160 B.t.u./k.w. hr.
- Net plant efficiency _____ 41.8%.

Steam conditions:
- Main steam pressure _____ 2400 p.s.i.g.
- Main steam temp. (turbine throttle) _____ 1000° F.
- Reheat steam temp. (turbine throttle) _____ 1000° F.

Turbine generator:
- Type of turbine generator ____ TCDF–30 in.–3600 r.p.m.
- Rated gross electric output ___ 210,049 kw.
- Main steam flow _____ 1,351,700 lb./hr.
- Reheat steam flow _____ 1,183,800 lb./hr.
- Condenser pressure _____ 1.5 in. Hg abs.
- Number of feedwater heaters _ 7.
- Final feedwater temp. _____ 473° F.

Nuclear steam generating system reactor:
- Core thermal power _____ 480 Mw. (t.).
- Fuel _____ Uranium carbide.
- Active core size (dia. x ht.) __ 13.5 ft. x 14 ft.
- Number of fuel elements ____ 168.
- Core loading (U) _____ 20,830 kg.
- Enrichment (U–235) _____ 3.80 wt. %.
- Average fuel burnup _____ 25,000 mwd./MTU.
- Average specific power _____ 23 $kwt_2$/kg. U.
- Lattice spacing _____ 10.25 in.
- Number of control elements __ 24.

Fuel elements:
- Geometry _____ 18-rod cluster.
- Fuel slug diameter _____ 0.50 in.
- Active length _____ 14 ft.
- Maximum hot-channel fuel temp. _____ 1750° F.
- Maximum fuel slug power ___ 24 kw./ft.

| Sodium Heat Transfer System | Main Circuit | Auxiliary Circuit |
|---|---|---|
| Thermal Capacity Mw. (t.) | 432 | 48 |
| Number of Primary Loops | 1 | 1 |
| Number of Secondary Loops | 1 | 1 |
| Number of Intermediate Heat Exchangers | 2 | 1 |
| Number of Steam Generator Banks | 2 | 1 |
| Primary Loop: | | |
| Sodium Temp. (° F.): | | |
| Reactor Inlet | 750 | 750 |
| Reactor Outlet | 1,150 | 1,150 |
| Sodium Flowrate (lb./hr.) | $12.2 \times 10^6$ | $1.35 \times 10^6$ |
| Secondary Loop: | | |
| Sodium Temp. (° F.): | | |
| Steam Generator Inlet | 1,075 | 1,075 |
| Steam Generator Outlet | 675 | 675 |
| Sodium Flowrate (lb./hr.) | $12.2 \times 10^7$ | $1.35 \times 10^6$ |

Having thus described the invention, we claim:

1. A sodium graphite reactor comprising:
   (a) calandria core tank disposed in a reactor cavity,
   (b) a reactor vessel surrounding said core tank in said cavity and spaced therefrom to define an annular space therebetween,
   (c) a beam positioned above said cavity,
   (d) said calandria core tank and said reactor vessel being independently supported by and suspended from said beam,
   (e) unclad graphite moderator disposed in said core tank,
   (f) a plurality of parallel, longitudinal process tubes extending through said graphite and sealed to said core tank,
   (g) fuel elements positioned in said process tubes,
   (h) sodium coolant filling said process channels and surrounding said core tank in said reactor vessel, and
   (i) means for circulating sodium through said process tubes and said reactor vessel.

2. The reactor of claim 1 wherein said sodium circulation means includes means for introducing sodium into the bottom portion of said calandria core tank and the annulus between said core tank and said reactor vessel, and means for withdrawing outlet sodium from said reactor vessel from a plenum above said core tank.

3. A sodium graphite reactor comprising:
   (a) a calandria core tank disposed in a reactor cavity, said core tank comprising
       (1) an outer generally cylindrical shell,
       (2) a bottom grid plate disposed laterally thereacross,
       (3) said shell having an integral generally elliptical lower head extending from said grid plate defining an inlet plenum chamber therebetween, and
       (4) supporting rods connecting said grid plate and said lower head,
   (b) a reactor vessel surrounding said calandria core tank in said cavity and spaced therefrom,
   (c) beam means positioned above said cavity,
   (d) means for independently supporting and suspending said core tank and said reactor vessel from said beam,
   (e) unclad graphite moderator disposed in said core tank and supported on said grid plate,
   (f) a plurality of parallel process tubes longitudinally traversing said graphite and sealed to said grid plate and to the outer shell of said core tank, said tubes having bellows to accommodate differential thermal expansion thereof,
   (g) fuel elements disposed in said process tubes,
   (h) sodium coolant filling said process tubes and said reactor vessel, said process tubes separating said sodium and said graphite moderator, and
   (i) means for circulating sodium through said process tubes and said reactor vessel.

4. The reactor of claim 3 wherein said sodium circulation means includes means for introducing sodium into said inlet plenum chamber of said calandria core tank and the annulus between said core tank and reactor vessel, and means for withdrawing outlet sodium from an outlet plenum defined by the upper head of said core tank and said reactor vessel.

5. The reactor of claim 4 wherein said sodium circulation means further includes an inlet sodium line penetrating said reactor vessel and said calandria core tank, terminating in said inlet plenum chamber, and means for bypassing sodium therefrom into said annulus between said reactor vessel and said core tank.

6. The reactor of claim 5 wherein said inlet sodium line is welded to said reactor vessel and makes a slip-fit with said calandria core tank, thereby permitting differential expansion between said core tank and said reactor vessel.

7. The reactor of claim 4 wherein said sodium withdrawal means includes a sodium collection manifold annularly positioned adjacent the inside of said reactor vessel and opposite said outlet plenum, said manifold communicating with said outlet plenum and discharging into a sodium outlet line.

8. The reactor of claim 7 wherein a standpipe extends from said manifold above the sodium level in the outlet plenum, said standpipe having a port in the bottom portion thereof communicating the annulus between the calandria core tank and the reactor vessel which discharges the sodium therein into said upper plenum.

9. The reactor claim 3 wherein said graphite and said process tubes are disposed in said calandria core tank in a plurality of unit cells, each said unit cell comprising a centrally positioned process tube, a cylindrical graphite collar integrally attached to said process tube, and individual graphite members in a cruciform configuration disposed contiguously to said process tube and said graphite collar.

10. The reactor of claim 9 wherein said process tube and graphite collar terminate in a hollow supporting fitting positioned in a port in said grid plate, and said cruciform graphite members are separately supported by a member resting on said grid plate.

11. A sodium graphite nuclear reactor comprising:
   (a) a calandria core tank disposed in a reactor cavity, said core tank comprising
      (1) an outer generally cylindrical shell,
      (2) a bottom grid plate disposed laterally thereacross
      (3) an integral generally elliptical lower head of said shell extending from said grid plate, said lower head and said grid plate defining an inlet plenum chamber, and
      (4) supporting rods connecting said grid plate and said lower head,
   (b) a reactor vessel surrounding said calandria core tank in said cavity and spaced therefrom,
   (c) beam means positioned above said cavity,
   (d) means for separately supporting said core tank and said reactor vessel from said beam,
   (e) unclad graphite moderator disposed in said core tank on said grid plate,
   (f) a plurality of parallel process tubes longitudinal traversing said graphite and sealed to said grid plate at one end and to the top shell of said core tank at the other end, said tubes having bellows to accommodate differential thermal expansion thereof,
   (g) said process tubes and said graphite being disposed in a plurality of unit cells removable from said core tank, each said unit cell comprising a central process tube, a cylindrical graphite collar attached to said process tube, individual graphite members in a cruciform configuration disposed contiguously to said process tube and said graphite collar,
   (h) fuel elements disposed in said process tubes,
   (i) sodium coolant filling said process tubes and said reactor vessel, said process tubes separating graphite from said sodium,
   (j) means for circulating sodium through said process tubes and said reactor vessel,
   (k) said sodium circulation means including sodium inlet means comprising an inlet line penetrating said reactor vessel and terminating in said inlet plenum, and means for bypassing sodium into the annulus between said core tank and said annulus, and
   (l) sodium outlet means including a sodium outlet plenum defined by the top of said core tank and said reactor vessel, a collection manifold annularly positioned adjacent the inside of said reactor vessel and opposite said outlet plenum, a sodium outlet line from said reactor vessel, said manifold communcating with said outlet plenum and discharging into said outlet line, and means for withdrawing sodium from said process tubes and the annulus between said core tank and said reactor vessel into said outlet plenum.

12. The reactor of claim 11 wherein said fuel element comprises a bundle of spaced parallel rods, each rod comprising uranium carbide fuel in an outer jacket and a molten metal heat transfer agent between the uranium and jacket.

13. The reactor of claim 11 wherein said process tube and said graphite collar terminate in a hollow supporting fitting positioned in a port in said grid plate, and a member resting on said grid plate separately supporting said cruciform graphite members.

References Cited by the Examiner

UNITED STATES PATENTS

| | | | |
|---|---|---|---|
| 2,929,768 | 3/1960 | Mahlmeister et al. | 176—84 X |
| 3,009,867 | 11/1961 | Kinsey | 176—61 X |
| 3,042,601 | 7/1962 | Loeb | 176—62 X |
| 3,080,308 | 3/1963 | Dickinson | 176—65 X |
| 3,121,052 | 2/1964 | Peterson et al. | 176—52 |
| 3,128,234 | 4/1964 | Cage et al. | 176—84 X |
| 3,169,117 | 2/1965 | Dickinson et al. | 176—40 X |
| 3,170,846 | 2/1965 | Blumberg | 176—53 |
| 3,182,002 | 5/1965 | Laithwaite et al. | 176—65 |
| 3,186,913 | 6/1965 | Weisner et al. | 176—50 |

CARL D. QUARFORTH, *Primary Examiner.*

L. DEWAYNE RUTLEDGE, *Examiner.*